(12) United States Patent
McNeill

(10) Patent No.: US 7,032,587 B2
(45) Date of Patent: Apr. 25, 2006

(54) BARBECUE APPARATUS TO SUSTAIN CHARCOAL BURNING AND ITS METHOD OF USE

(76) Inventor: Allen R. McNeill, 871 Twin Pine Dr., Kirkwood, MO (US) 63122

( * ) Notice: Subject to any disclaimer, the term of this patent is extended or adjusted under 35 U.S.C. 154(b) by 0 days.

(21) Appl. No.: 10/771,921

(22) Filed: Feb. 2, 2004

(65) Prior Publication Data

US 2004/0154606 A1    Aug. 12, 2004

Related U.S. Application Data

(63) Continuation-in-part of application No. 09/564,131, filed on May 3, 2000, now Pat. No. 6,688,301.

(60) Provisional application No. 60/135,828, filed on May 24, 1999.

(51) Int. Cl.
*F24B 3/00* (2006.01)
*C10L 11/06* (2006.01)

(52) U.S. Cl. ...................................... 126/25 B; 44/534
(58) Field of Classification Search ............. 126/25 R, 126/25 B; 44/519, 534
See application file for complete search history.

(56) References Cited

U.S. PATENT DOCUMENTS

| | | | |
|---|---|---|---|
| 611,376 A | 9/1898 | Craig | |
| 793,379 A | 6/1905 | Jones | |
| 2,834,661 A * | 5/1958 | Chaplin | ............ 126/25 B |
| 3,035,566 A * | 5/1962 | Keeney | ............ 126/25 R |
| 3,132,639 A | 5/1964 | Roberts | |
| 3,309,982 A | 3/1967 | Surks | |
| 3,667,449 A | 6/1972 | Persinger et al. | |
| 4,592,334 A | 6/1986 | Logan, Jr. | |
| 4,953,533 A * | 9/1990 | Witt | ............ 126/25 B |
| 5,074,279 A | 12/1991 | Sainsbury | |
| 5,615,666 A | 4/1997 | Ransom | |
| 5,678,531 A | 10/1997 | Byers et al. | |
| 6,065,464 A | 5/2000 | Zajec | |
| 6,523,463 B1 | 2/2003 | Hogle | |

OTHER PUBLICATIONS

Grill Lovers Catalog Wide Body Series by Char-Broil, Published Summer 1999.
Weber Owner's Guide by Weber-Stephen Products Co., Published Mar. 1997.
Weber Assembly Instructions for Bar-B-Kettle by Weber-Stephen Products Co., Published 1993.

\* cited by examiner

*Primary Examiner*—Josiah C. Cocks
(74) *Attorney, Agent, or Firm*—Thompson Coburn LLP

(57) ABSTRACT

A barbecue grill apparatus for sustaining charcoal burning in an outdoor smoker/cooker has a divider wall with a plurality of bends that form a circuitous pathway between opposing surface sections of the wall. The wall is received into a heat chamber of the smoker/cooker resting on its bottom edge, and the pathway is lined with cooking fuel. The fuel is burned along the pathway which causes the fuel to burn slowly and at a reduced heat.

19 Claims, 6 Drawing Sheets

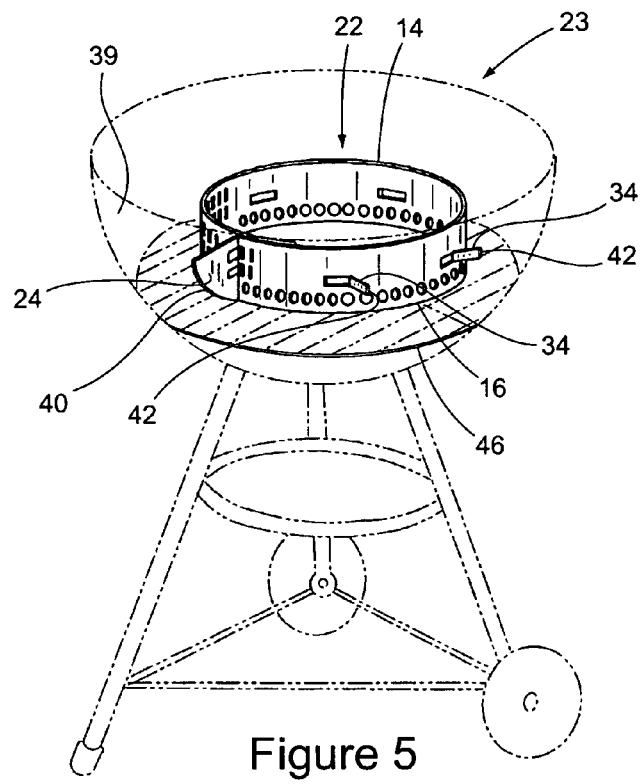
Figure 5
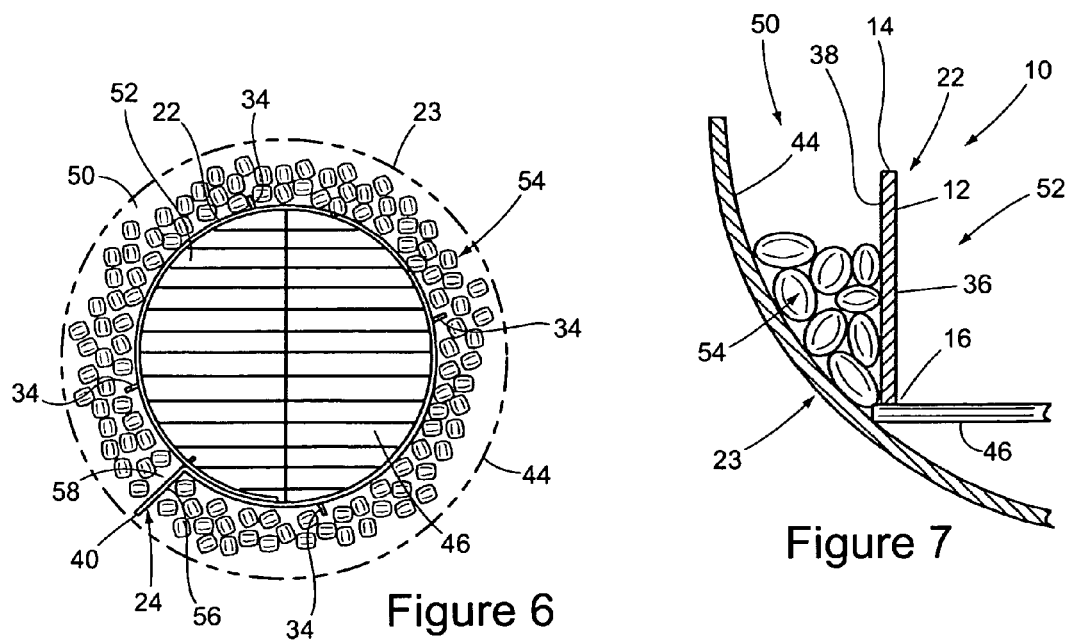
Figure 6
Figure 7

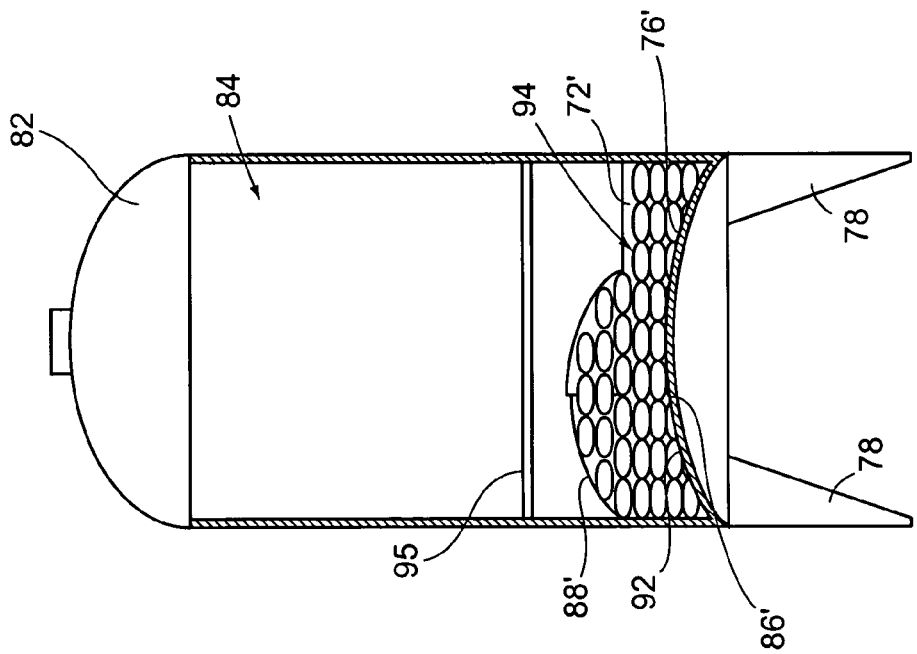
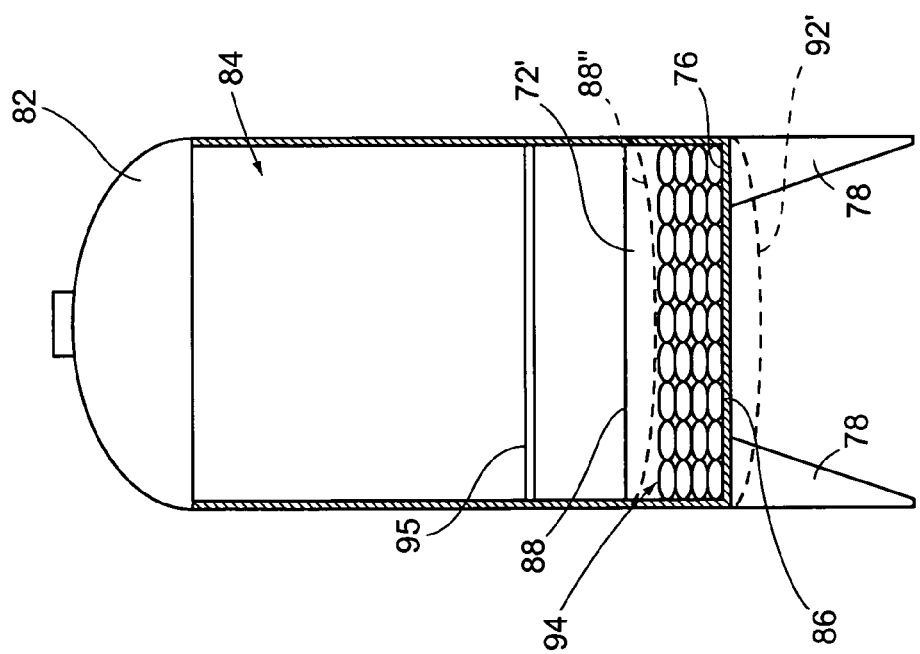

BARBECUE APPARATUS TO SUSTAIN CHARCOAL BURNING AND ITS METHOD OF USE

This patent application is a continuation-in-part of patent application Ser. No. 09/564,131, which was filed on May 3, 2000 Now U.S. Pat. No. 6,688,301, and which claimed the benefit of provisional application Ser. No. 60/135,828, which was filed on May 24, 1999.

BACKGROUND OF THE INVENTION (1) Field of the Invention

The invention relates generally to an apparatus and a method of using the apparatus that controls a prolonged and continuous burning of charcoal in a charcoal burning barbecue grill for slow, low temperature cooking of meat. In particular, the apparatus is a loop form divider wall that is placed in a conventional charcoal barbecue grill to divide the heat chamber of the barbecue grill into inner and outer volumes, the outer volume being a circular volume. Cooking fuel such as charcoal is placed in the outer volume to create a circular path of charcoal that burns slowly to slow cook and smoke meats. In an alternate embodiment of the apparatus, the divider wall is provided with a plurality of bends that form a circuitous pathway between opposing surface sections of the wall. The pathway is lined with cooking fuel and the fuel is burned along the pathway which causes the fuel to burn slowly.

(2) Description of the Related Art

It is well known that various meats, such as beef brisket and pork rump, have a much better taste, flavor, and texture, and provide an improved yield when smoked for a prolonged period of time at lower or controlled cooking temperatures. Conventional charcoal barbecue grills do not provide an adequate means for prolonging the cooking cycle. In these conventional barbecue grills, the charcoal or coals are usually piled in a mound in the center of the heat chamber and ignited. This technique concentrates the heat of the ignited coals and promotes the igniting and burning of all of the coals in the pile. When the coals appear white such that each is sufficiently burning, the coals are spread out in the heat chamber of the barbecue grill, and the grill is placed over the coals so that uniform heat is radiated from the burning coals to the grill. In this process, the coals are generally ignited at the same time so that all the coals reach their maximum heat generating capacity at about the same time. Since the coals are spread uniformly throughout the heat chamber and the structure of the barbecue grill provides a means for radiantly and evenly distributing the heat generated onto the grill, foods may be cooked quickly. However, since the charcoal is usually accumulated around the center of the heat chamber of the barbecue grill, the rate of charcoal burning or the amount of the heat generated from charcoal burning cannot be controlled.

As the charcoal briquettes burn, they expend their heat generating capacity and slowly cool. The peak temperature and amount of heat generated in the heat chamber depends largely upon the amount of charcoal burned in the heat chamber. To quicken or slow the rate at which charcoal is consumed, conventional barbecue grills may be provided with air valves to control the amount of air introduced into the heat chamber. Opening and closing of the valves varies the amount of air fed into the chamber. This may quicken or slow the rate at which the charcoal reaches its peak temperature and its maximum heat generating capacity. For cooking some foods, varying these parameters is satisfactory. However, for foods requiring extended cooking times, the adjustment of air valves is often found to be insufficient to slow cook meats at low temperatures for an extended cooking cycle.

In order to sustain charcoal burning at a low temperature heat for a prolonged cooking cycle, it is usually necessary to add new charcoal periodically to the heat chamber during the duration of the cooking time period. Because the grill or cooking surface is usually located above the heat chamber, the grill must first be removed to access the heat chamber and to add charcoal. Understandably, it is very inconvenient to remove the grill to add new coals while the grill is hot and the slow cooking meat is on the grill.

SUMMARY OF THE INVENTION

The apparatus of the present invention overcomes the disadvantages encountered in using conventional charcoal barbecue grills to slow cook and smoke meat and other foods with a reduced heat of charcoal burning over an extended period of time. The present invention provides a divider in the form of a loop that is positioned in the heat chamber of the conventional barbecue grill to support cooking fuel such as charcoal in a piled ridge around the divider. The loop controls the charcoal briquettes so that they burn slowly in a path along the outer periphery of the loop divider.

In alternate embodiments of the apparatus, the divider wall is provided with a plurality of curved portions or angled bends along its length. The bends or angled portions of the band form a circuitous pathway between opposing surface sections of the band. The opposed surface sections of the band support cooking fuel piled in the pathway and direct the burning of the cooking fuel so that it burns slowly along the pathway.

The present invention provides a charcoal barbecue grill accessory that may be designed to be used in conventional charcoal barbecue grills and smokers of various shapes and sizes. The barbecue grill accessory includes a divider having a top edge and a bottom edge spaced apart by a wall. The divider is formed in a closed loop and placed in the heat chamber of the barbecue grill resting on its bottom edge. Typically, the divider forms a circular, vertical wall in the heat chamber that divides the heat chamber into an inner volume bounded by an interior surface of the wall and an outer volume surrounding the exterior surface of the wall and the inner volume. The outer volume is defined by the divider and the housing structure of the barbecue grill in the heat chamber. Charcoal is deposited in the outer volume, supported by the wall and the housing of the barbecue grill. In this way, the charcoal may be piled in a manner to control and enhance its burning. The charcoal is arranged in a path around the loop form divider around which the charcoal will burn slowly at a reduced temperature over time.

The divider has a flange that extends outwardly from the divider wall exterior surface into the outer volume. The flange separates a beginning end of the charcoal burn path from a finishing end of the charcoal burn path and controls the burning of the charcoal in one direction around the divider wall. The charcoal is ignited and burns over time around the outer volume from one side of the flange to the opposite side of the flange. Thus, the user need not add charcoal to the heat chamber to prolong the cooking cycle. In addition, because the divider wall provides support for the charcoal piled or stacked in a ridge around the divider wall, only a small portion of charcoal in the burn path of the ridge burns at any one time. This enables slow cooking over an extended time at reduced heat.

By arranging the charcoal briquettes on the outer periphery of the divider wall and positioning the food to be cooked toward the center of the divider wall, the food avoids the direct heat emanating from the briquettes that could possibly scorch the food. Instead, the food is grilled and smoked at a reduced temperature by the indirect heat radiating from the burning briquettes.

The divider is provided with spacing tabs extending outward into the outer volume. The spacing tabs together with the flange cooperate to center the partition within the heat chamber. The divider is provided with a plurality of openings through the wall, thus, allowing the outer volume to be in communication with the inner volume to enhance the circulation of air into the outer volume for maintaining the burning of the coals.

Variant embodiments of the apparatus are formed by the divider wall being constructed from an elongate band having a plurality of curved portions or angled bends formed in the length of the band. In one embodiment, the curved portions of the band give the band a spiral configuration with a plurality of surface sections of the band overlapping each other. The overlapping surface sections define a pathway between the surface sections that also has a spiral configuration. The band is positioned in the heat chamber of the outdoor cooker, such as a barbeque grill or a smoker, and the pathway defined by the band is filled with cooking fuel, such as charcoal. The opposing surface sections of the band hold the charcoal in the pathway and define a burning path from a beginning end of the fuel to a finishing end of the fuel. The configuration of the band controls the burning of the charcoal along the pathway from the charcoal beginning end to the charcoal finishing end. This enables slow cooking over an extended time at a reduced heat.

In still further variant embodiments of the apparatus, the curved or angled portions of the band length form surface sections of the band that overlap each other, where the opposing surface sections are parallel to each other and where the opposing surface sections have equivalent curvatures.

BRIEF DESCRIPTION OF THE DRAWINGS

Further objects and features of the invention are revealed in the following detailed description of the preferred embodiment of the invention and in the drawings wherein:

FIG. 5 is a perspective view of the barbecue grill accessory installed in a barbecue grill, the barbecue grill is shown in phantom lines;

FIG. 6 is a top, plan view of the barbecue grill of FIG. 5 with the barbecue grill accessory received in a heat chamber of the barbecue grill, the barbecue grill is shown in phantom lines;

FIG. 7 is a partial, cross sectional view of the barbecue grill accessory installed in the barbecue grill with charcoal briquettes stacked against the barbecue grill accessory and a housing of the heat chamber of the barbecue grill;

FIG. 8 is a front elevation view, in section, of a further embodiment of the apparatus employed inside an outdoor cooker such as a barbeque grill or a smoker;

FIG. 9 is a front elevation view, in section, of the apparatus employed in a further embodiment of an outdoor cooker;

Corresponding reference characters indicate corresponding parts throughout several views of the drawings.

DESCRIPTION OF THE PREFERRED EMBODIMENT

Figure 1:
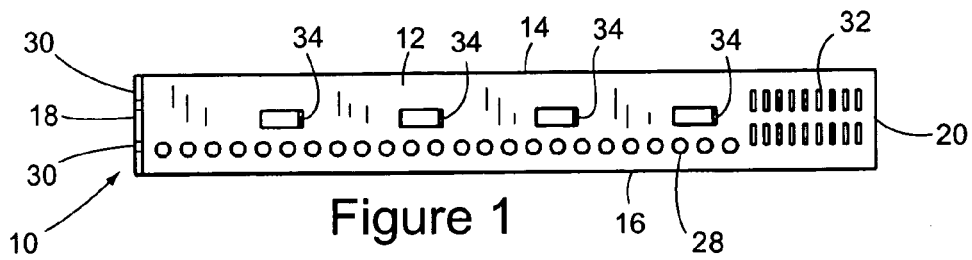
FIG. 1 is a front elevational view of the barbecue grill accessory of the present invention.
Figure 2:
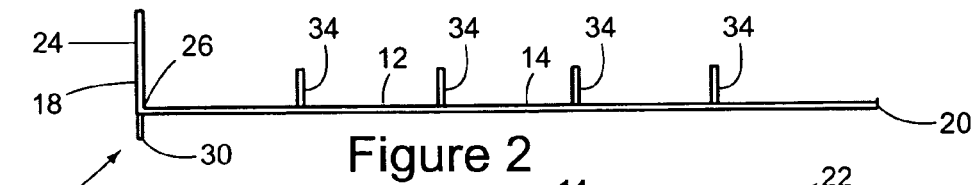
FIG. 2 is a top plan view of the barbecue grill accessory of FIG. 1.

FIGS. 1 and 2 show a general construction of the barbecue grill accessory of the present invention. The barbecue grill accessory 10 is constructed as an elongate, rectangular wall 12 having a top edge 14, an opposite, parallel bottom edge 16, and opposite first 18 and second 20 ends extending perpendicularly between the edges 14,16. Preferably, the vertical height of the wall 12 between the top and bottom edges 14,16 is about 5 inches. The overall horizontal length of the wall between the first and second ends 18,20 is preferably about 65 inches. These dimensions allow the wall 12 to be manipulated into a close loop form 22 shown in FIGS. 3 and 4 that may be used with a 18" or 22½" diameter bowl shaped or kettle shaped barbecue grill 23 shown in FIGS. 5 and 6. However, the dimensions of the wall may be varied as required for use in barbecue grills and smokers of different shapes and sizes.

As shown in FIGS. 1 and 2, the first end of the wall 16 is provided with a flange 24. The flange 24 extends perpendicularly away from the wall 12. Preferably, the flange 24 extends between the top and bottom edges 14, 16 of the wall 12 so as to have the same vertical height as the wall 12. Preferably, the flange 24 is formed integral with the wall 12 and folded about a fold line 26 to extend outwardly from the wall 12. The flange may also be a separate piece that is attached to the wall using any of a variety of fastening means such as welding or mechanical fasteners.

As shown in FIGS. 1 and 2, the wall 12 is provided with a plurality of circular openings 28 positioned adjacent its bottom edge 16. The plurality of openings 26 permit air flow through the wall 12, as will be explained later. The openings 28 are sized to permit sufficient air flow while maintaining the structural integrity of the wall 12, especially during repeated heat cycles.

As shown in FIGS. 1 and 2, the wall is formed with holding tabs 30 that extend outward and away from the wall 12 in a direction opposite that of the flange 24. Preferably, the holding tabs 30 are formed integral with the wall 12. In this arrangement, the tabs 30 are formed by making two cuts in the flange 24 in a generally "U"-shaped pattern, forming the holding tabs 30 within the cuts, and then bending the holding tabs 30 outwardly away from the wall 12. Preferably, the holding tabs 30 are bent across the same fold line 26 as the flange 24 so that the tabs extends outward from the wall 12 in the same plane as the flange 24.

As shown in FIG. 1, the wall 12 is also provided with a plurality of slots 32 through the wall 12. The slots 32 are arranged in pairs that begin adjacent the second end 20 of the wall and extend toward the first end 18 of the wall. The slots 32 are formed in positions between the top 14 and bottom 16 edges of the wall that correspond to the positions of the holding tabs 30 between the top 14 and bottom 16 edges of the wall. Any one pair of slots is capable of receiving the holding tabs 30 when the first and second ends 18,20 of the wall are brought together and overlapped. Because the tabs are preferably formed adjacent the first end 18 of the wall and the slots pairs of 32 begin adjacent the second end 20 of the wall, the user may form the wall in several different sized loops of different diameters by overlapping the ends of the wall and inserting the tabs 30 into a selected pair of the slots 32.

As shown in FIGS. 1 and 2, the wall 12 is also provided with a plurality of spacing tabs 34. Preferably, the spacing tabs 34 are formed in the same manner as the holding tabs 30, i.e., by making several cuts in the wall 12 in a generally "U"-shape pattern, forming the spacing tabs 34 in the cuts, and then bending the spacing tabs 34 outward away from the wall 12. The number of spacing tabs depends upon the length and shape of the divider wall to be formed. Preferably, the spacing between the tabs is such that the spacing tabs 34 and flange 24 are evenly spaced along the wall 12. The spacing tabs are formed toward the bottom of the wall to minimize their outward extension when the loop form is used in a bowl shaped or kettle shaped barbecue grill having a concave shaped heat chamber.

The wall 12 is preferably made from a sheet of metal capable of withstanding repeated heat cycles. The thickness of the material is preferably sized to allow the wall 12 to be easily rolled into the loop form 22 shown in FIGS. 3 and 4 or arranged in another shape as required by the geometry of the heat chamber of a particular style of barbecue grill. The thickness of the wall 12 is sized to allow the flange 24, the plurality of openings 28, the holding tabs 30, the plurality of slots 32, and the spacing tabs 34 to be easily formed by punching and bending operations. The wall may also be made from other materials such as consumable materials that burn along with the charcoal and do not provide adverse taste to the food being cooked.

Figure 3:
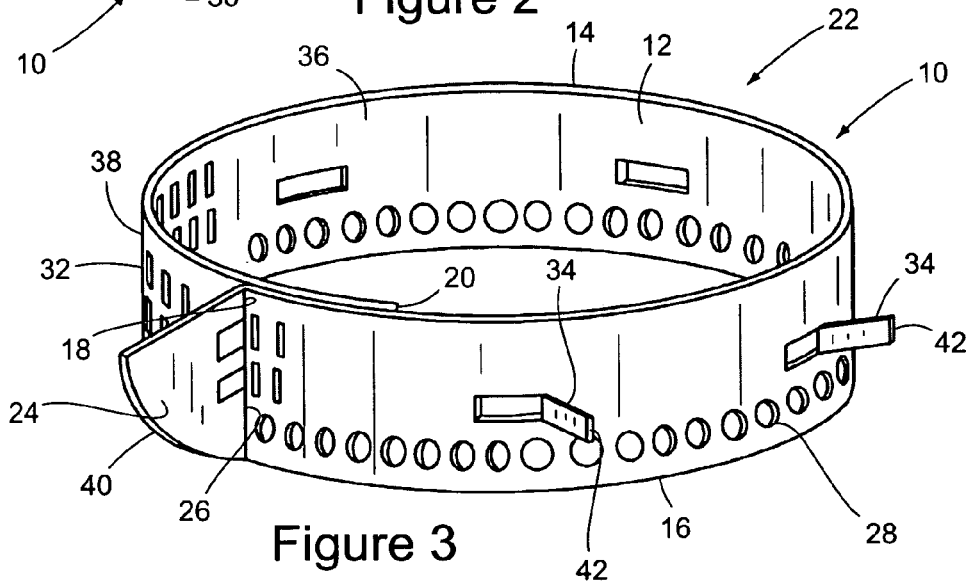
FIG. 3 is a perspective view of the barbecue grill accessory of FIG. 1 formed in a loop.
Figure 4:
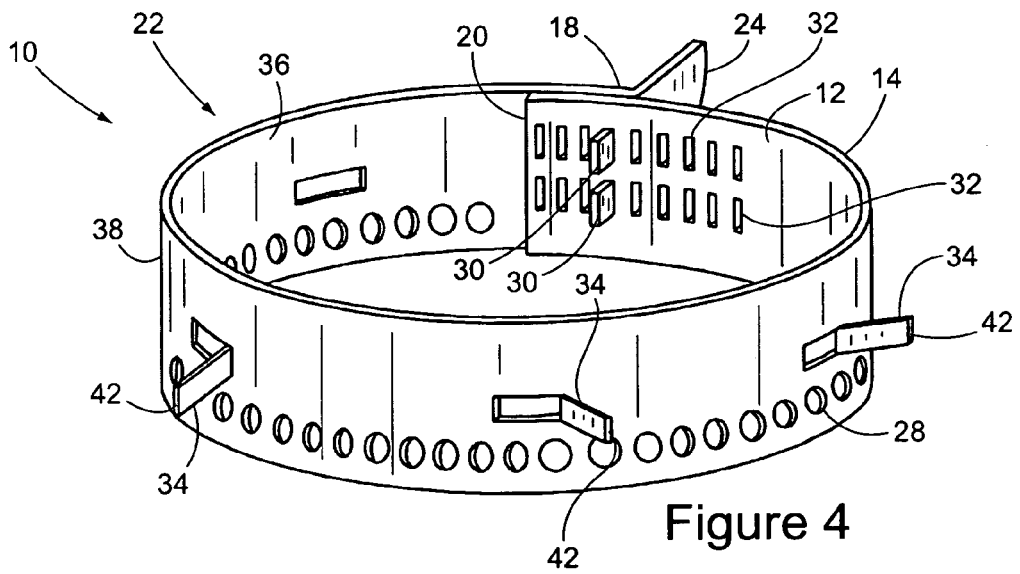
FIG. 4 is a perspective view of the barbecue grill accessory of FIG. 3 turned 180°.

FIGS. 3 and 4 show a general view of the barbecue grill accessory 10 of the present invention when the divider wall 12 has been bowed into the loop form 22. The divider wall 12 formed in the circular loop 22 has an interior surface 36 and an exterior surface 38. The flange 24 and the spacing tabs 34 extend from the exterior surface 38 of the loop 22 while the holding tabs 30 project from the interior surface 36 of the loop 22. To fix the overlapping ends of the wall 12 and maintain the loop 22 in its desired adjusted length or size, the first and second ends 18,20 of the wall 12 are overlapped and held in position by inserting the holding tabs 30 into a pair of slots 32 that set the desired diameter of the loop.

As shown in FIG. 5, the barbecue grill accessory 10 may be adjusted as required to fit into a heat chamber 39 of the particular charcoal barbecue grill 23 in which it is to be used. To adjust the diameter size of the loop 22 shown in FIGS. 3 and 4, the holding tabs 30 are removed from the slots 32 and the ends of the wall 18,20 are moved accordingly to adjust the extent of their overlap and to achieve the proper diameter or shape of the loop 22. The loop form 22, having an adjustable diameter range of roughly 15" to 18", is optimal for use in a 18" or 22½" diameter kettle-shaped or bowl-shaped barbecue grill such as the one depicted in FIG. 5. However, the invention may also be practiced by forming the wall into a rectangular loop or other shaped loop, as required, to conform to the general shape of the heat chamber of a barbecue grill.

To allow the loop form 22 to more readily conform to the contours of the heat chamber 39 of the kettle shaped or bowl shaped barbecue grill, the flange 24 and spacing tabs 34 may each be provided with shaped distal ends 40,42. As shown in FIG. 3, the distal edge 40 of the flange 24 has an arcuate, tapered shape where the outward extension of the flange 24 toward the top edge 14 of the wall 24 is greater than the outward extension of the flange 24 at the bottom edge 16 of the wall 12. This allows the distal edge 40 of the flange 24 to conform to the generally concave shape of the heat chamber 39 of the kettle or bowl shaped barbecue grill. In a similar arrangement, the distal edges 42 of the spacing tabs 34 have a generally arcuate shape that matches and conforms to the general shape of the heat chamber 39. Preferably, the spacing tabs 34 and that portion of the flange 24 that is located at the same relative height from the bottom edge 16 of the wall as the spacing tabs 34 extend outward from the exterior surface 38 of the wall the same distance. In this way, the flange 24 and the spacing tabs 34 set the loop 12 off from the interior surface of the wall 44 of the barbecue grill heat chamber 39.

In setting up the barbecue grill accessory 10 for operation inside the heat chamber 39 of the barbecue grill 23 of FIG. 5, the loop form of the divider wall 12 is adjusted as required to fit inside the heat chamber 39 of the barbecue grill 23. The divider loop 22 may then be placed in the heat chamber 39 of the barbecue grill using the spacing tabs 34 and the flange 24 to center the divider loop 22 in the heat chamber 39 as shown in FIG. 6. The divider loop 22 is rested on its bottom edge 16 on a charcoal support 46. The charcoal support 46 may be either a grate in the bottom of the heat chamber, or an interior surface of the bottom structural wall of the barbecue grill heat chamber. In this arrangement, the divider loop 22 divides the heat chamber 39 into an inner volume inside the divider wall 12 and an outer volume 50 between the exterior surface 38 of the divider wall 12 and the interior surface 44 of the heat chamber 39.

As shown in FIGS. 6 and 7, charcoal briquettes 54 are deposited into the outer volume 50. FIG. 7 shows how the divider wall supports a small number of charcoal briquettes that are stacked or piled on each other to concentrate the heat of burning charcoals and enhance the ignition and burning of other charcoals in the pile. To provide adequate air flow into the outer volume 50 to ignite the charcoal 54, the plurality of openings 28 in the wall 12 permit convection forces to draw air from the inner volume 52 into the outer volume 50 for charcoal burning. In those barbecue grills where the charcoal grate is not provided, the loop form divider may be set in the heat chamber so that the bottom edge 16 of the divider rests on the interior surface of the heat chamber below the cooking grill (not shown). In this arrangement, the plurality of openings 28 will also provide air flow for ignition and sustain burning of the charcoal 54.

In the bowed loop 22 arrangement shown in FIG. 6, the flange 24 extends outward into the outer volume 50 to further segment the outer volume 50. Preferably, the flange 24 extends outward so as to contact the interior surface of the wall 44 of the heat chamber 39. Charcoal 54 is deposited into the outer volume 50 as shown in FIGS. 6 and 7 so that the charcoal 54 forms a continuous path around the outer volume 50. With the flange 24 extending outward into the outer volume 50 as shown in FIG. 6, the flange 24 forms a boundary in the path of the charcoal 54. In this arrangement, the flange 24 creates a start point 56 and an end point 58 for charcoal burning on either side of the flange 24. The start point 56 and end point 58 are adjacent, but separated by the thickness of the flange 24. The flange 24 serves to facilitate the guiding of charcoal burning in one direction around the periphery of the divider loop 22.

The charcoal is ignited at the start point 56 of the charcoal burn path on one side of the flange 24. Over time, the charcoal 54 will burn around the periphery of the divider loop 22 until it reaches the end point 58 on the other side of the flange 24. This arrangement provides a method for continually introducing new charcoal 54 to the burning process to maintain a low temperature heat in the heat chamber 39 to cook foods over a prolonged period of time. The burning of the charcoal in the outer portions of the heat chamber of the barbecue grill indirectly cooks the foods at a low temperature further improving the yield and taste of the meats being grilled.

The heat chamber of the barbecue grill may also be further segmented by arranging several dividers in a concentric pattern with an intermediate volume forming the area for depositing charcoal in a path. In very large barbecue grills having large volume heat chambers, it may be necessary to install a second divider in the heat chamber to further segment the heat chamber and create an intermediate volume concentric with the outer and inner volumes, previously described. This may be preferred where the heat chamber is too large to form an outer volume between the divider and the housing of the heat chamber for the cooking task to be completed. In this case, the intermediate volume may be formed for the cooking task and the size of the loops may be adjusted to control the amount of charcoal in the intermediate volume.

As stated previously, the divider loop 22 may be adjusted in size so that the distal edge 40 of the flange 24 and the distal ends 42 of the spacing tabs 34 contact the walls 44 of the heat chamber 39. In this arrangement, the size of the outer volume 50 is dictated by the preset outward extension of the flange 24 and spacing tabs 34. In an alternative construction, the flange may have an adjustment capability where the flange has a base piece that is rigidly attached to the divider wall and an extension member having a sliding connection to the base piece that enables varying the extension of the flange. This construction gives the user the option to increase the outer volume and add more charcoal to increase the relative temperature during an extended cooking cycle.

Similarly, the spacing tabs may be constructed with a variable adjustment. For instance, the spacing tabs may be separate members with threaded or sliding connections to the divider so that the spacing tabs may be rotated or otherwise moved to achieve the desired length of extension. Preferably, the spacing tabs have a minimal cross section extending outward from the wall so that the spacing tabs do not interfere with the combustion or burning charcoal in the outer volume. The spacing tabs must also be sufficiently constructed so as to withstand the heat generated in the heat chamber during use.

The barbecue grill accessory may also be formed in a loop without a flange where, in use, the start and end points of the charcoal burn path are spatially separated from one another. However, in order to maximize the amount of charcoal deposited in the outer volume, the flange arrangement is preferred for providing support to the charcoal briquettes placed in the outer volume.

The barbecue grill accessory may also be configured without a size adjustment capability. In this configuration, the system of cooperating tabs and slots may be used as one of many possible methods of mechanically attaching the first and second ends of the wall together to form the loop form divider.

The divider loop 22 shown in the drawings is of monolithic construction; however, the divider may also be formed by mechanically attaching multiple sections together to form a continuous loop having the required shape. These multiple sections may be joined together by a system of cooperating tabs and slots similar to the arrangement shown in FIGS. 3 and 4, or by other mechanical fastening means known in the art. This arrangement may be preferred when the heat chamber is rectangular in shape and the divider can be constructed from 4 independently joined panels. To simplify packaging requirements and to reduce stocking areas in retail stores, the larger divider loop 22 may be formed from smaller, individual panels that may be assembled for use to form the larger divider loop 22 shown in the figures.

FIGS. 8–12 show variant embodiments of the apparatus of the invention. FIGS. 8 and 9 show the apparatus in combination with an outdoor cooker, more specifically, a smoker. Although the apparatus is shown in combination with a smoker in FIGS. 8 and 9, it should be understood that all the embodiments of the apparatus described may be employed with various different types of outdoor cookers.

In each of the variant embodiments of the apparatus shown in FIGS. 8–12, the apparatus is comprised of a divider wall as in the earlier described embodiment, except that the divider wall is formed from a band having several different configurations. FIGS. 8 and 9 show the band 72 combined with a smoker/outdoor cooker. The smoker/cooker has a cylindrical sidewall 74 and a circular bottom wall 76 that are supported on a plurality of legs 78. A lid 82 rests on a top edge of the sidewall 74 and encloses the hollow interior heat chamber 84 of the smoker/cooker. A cooking grate 86 is supported in the heat chamber 84 at a spaced position above the smoker/cooker bottom wall 76.

When used with a smoker/cooker such as that shown in FIGS. 8 and 9, the band 17 of the several embodiments of the apparatus to be described is constructed with a bottom edge 86 that rests on the smoker/cooker bottom wall 76. In each of the variant embodiments, the configuration of the band 72 positions the band in the heat chamber 84 supported on the smoker/cooker bottom wall 76, with the band extending upright from the band bottom edge 86 to a top edge 88 of the band. In each of the variant embodiments of the apparatus, the configuration of the band 76 is within an outer peripheral boundary of the band that is dimensioned to be received inside the smoker/cooker heat chamber 84 adjacent to the interior surface of the smoker/cooker sidewall 74. In the embodiment of the band 72 shown in FIG. 8, the band bottom edge 86 and top edge 88 are parallel to each other. The band bottom edge 86 rests on the flat bottom wall 76 of the smoker/cooker.

In a variation from the band and the smoker/cooker bottom wall shown in FIG. 8, the band 72' of FIG. 9 has a bottom edge 86' that has a curved configuration. This embodiment of the band 72' is employed with a smoker/cooker similar to that shown in FIG. 8, except that the bottom wall 76' has an interior convex surface 92. The convex surface 92 supports the curved band bottom edge 86'.

With cooking fuel, for example charcoal 94, being positioned in the interior of the smoker/cooker, the bottom walls 76, 76' of the two smokers/cookers shown in FIGS. 8 and 9 support the fuel. The bands 72, 72' separate the cooking fuel into burning pathways to be described. The burning pathways defined by the bands 72, 72' prolong the burning of the fuel 94 along the pathways. As seen in FIG. 9, due to the convex configuration of the smoker/cooker bottom wall 92, the center portion of the band 72' is raised or elevated relative to the outer periphery of the band. This causes the cooking fuel 94, for example charcoal, positioned within the burning pathway defined by the band 72' to also be raised toward the center of the band 72' relative to the cooking fuel positioned adjacent the outer periphery of the band. This enables the operator to accelerate the burning process by lighting the coals nearest the periphery. The uphill direction of each successive contiguous piece of fuel will enhance its quicker ignition as the nature of the heat is to rise. Conversely, the operator may decelerate the process by starting the fuel at its highest point. Each successive contiguous piece of fuel would be slightly lower in the horizontal plane of the fuel-piece igniting it and thereby slowing the process because heat rises.

In a variant embodiment of the smoker/cooker, the smoker/cooker bottom wall 92' could be provided with a concave top surface represented by the dashed line in FIG. 8. The band employed with this embodiment of the smoker/cooker will have a top edge 88' that is positioned in a concave plane. Cooking fuel 94' positioned toward the center of the concave band will be spaced a further distance from the cooking grate 95 than cooking fuel adjacent the outer periphery of this embodiment of the band. Thus, cooking fuel toward the center of the band, when burned, will provide less heat to food supported on the cooking grate 95 than the burning cooking fuel adjacent the periphery of the band.

Figure 10:
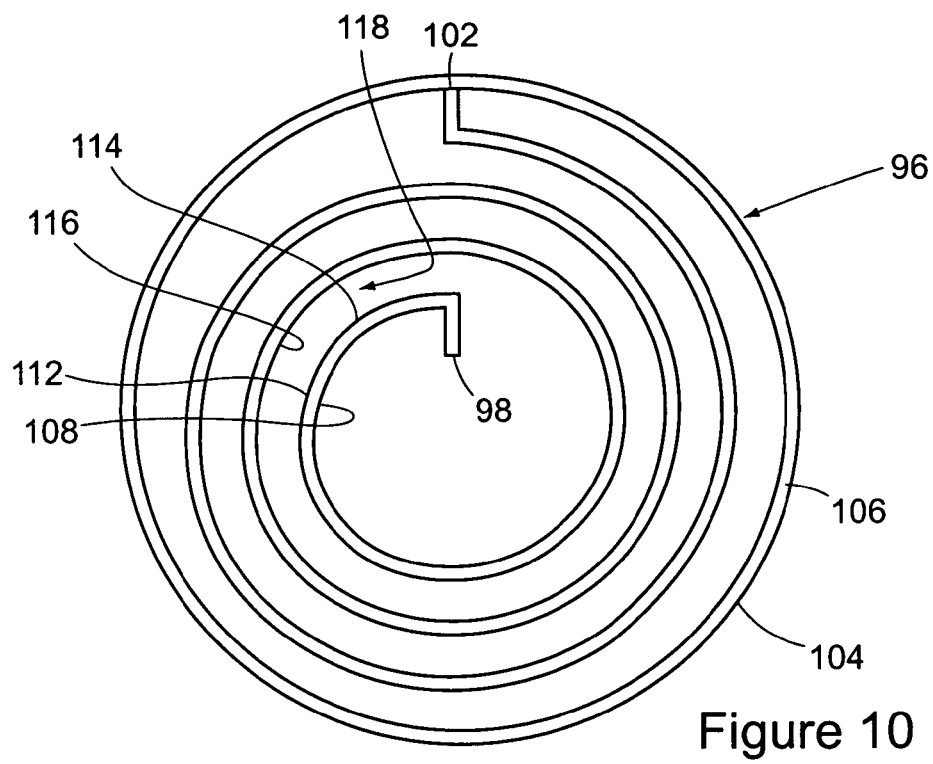
FIG. 10 is a top plan view of a variant embodiment of the apparatus positioned in the heat chamber of an outdoor cooker.

FIG. 10 shows a first configuration of the band 72, 72' of FIGS. 8 and 9. The band 96 shown in FIG. 10 is positioned inside the smoker/cooker sidewall 74 of the smoker/cooker embodiments of FIGS. 8 and 9, with the band bottom edge 86, 86' resting on top of the bottom wall 76, 76'.

The embodiment of the band 76 shown in FIG. 10 is formed having a length with opposite first 98 and second 102 end edges. The band 96 is a thin elongate strip having opposite bottom 104 and top 106 edges that extend along its length, and opposite first 108 and second 112 surfaces. The length of the band 96 between its first end edge 98 and second end edge 102 is formed with a plurality of curved portions or bends that give the band a spiral configuration. The spiral configuration forms pluralities of opposing wall surface sections 114, 116 that define a pathway 118 between the opposing surface sections of the band. The pathway 118 is dimensioned to receive an amount of cooking fuel, for example charcoal, in the pathway. The configuration of the band 96 gives the band pathway 118 a configuration that directs burning of the cooking fuel along the pathway 118, from the band first end edge 98 toward the band second end edge 102, or vice versa, and thereby sustains the burning of the cooking fuel.

Figure 11:
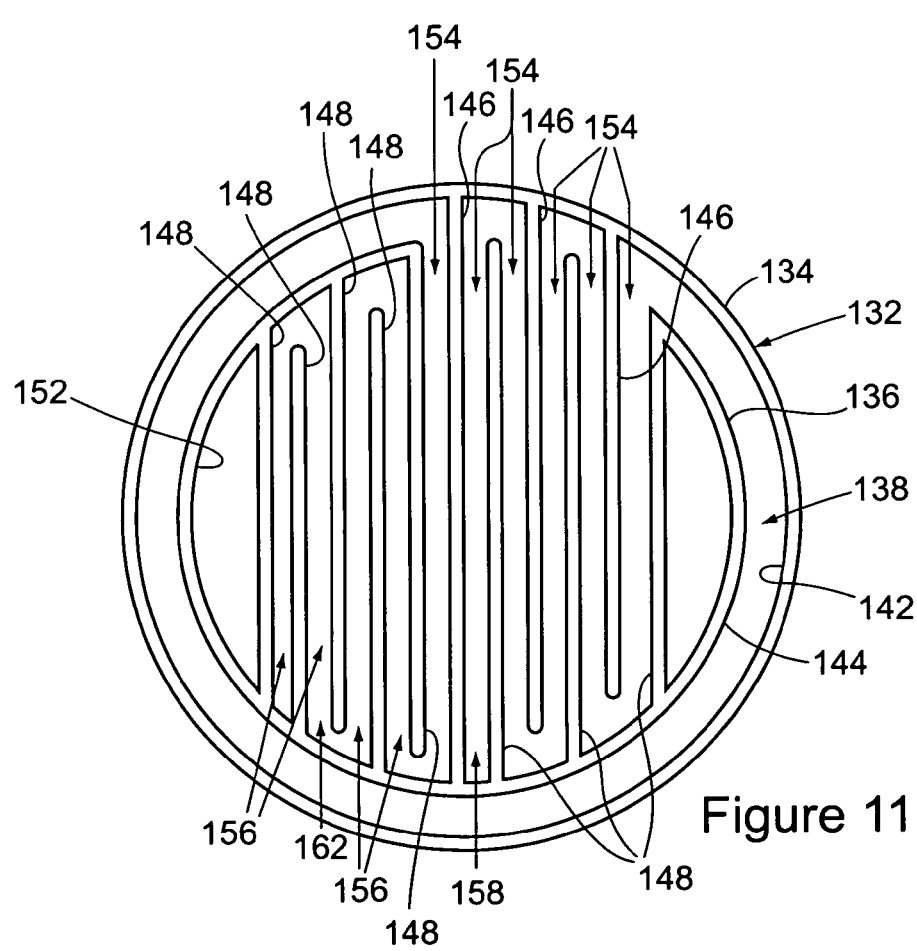
FIG. 11 is a top plan view of a still further variant embodiment of the apparatus.
Figure 13:
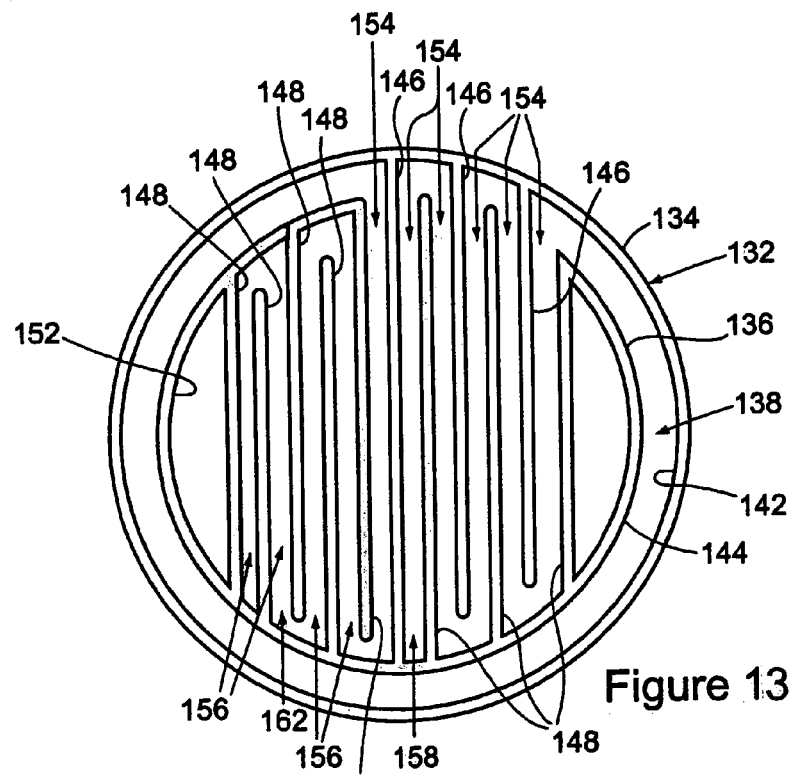
FIG. 13 is a multiple band equivalent of the apparatus of FIG. 11.

A further embodiment of the apparatus band 132 is shown in FIGS. 11 and 13. The apparatus embodiment of FIGS. 11 and 13 is formed with a configuration similar to that of FIG. 10. The FIGS. 11 and 13 apparatus is comprised of a circular outer peripheral wall section 134 that extends around the apparatus and is dimensioned to be received inside the heat chamber 84 of the smoker/cooker. A smaller, inner cylindrical wall 136 is spaced radially inwardly from the outer cylindrical wall 134 and defines a circular portion of a pathway 138 between the two walls. The circular portion of the pathway 138 is defined by the pair of opposing wall surfaces 142, 144 of the respective outer circular wall 134 and inner circular wall 136.

A first plurality of straight, parallel wall sections 146 extend inwardly from the inner wall surface 144 of the outer circular wall 134. An additional, second plurality of straight, parallel wall sections 148 extend from the inner surface 152 of the inner circular wall 136. The first plurality of straight wall sections 146 overlap with at least some of the second plurality of straight wall sections 148, forming zigzag portions of a pathway 154 between the opposing wall surfaces. At least some of the second plurality of straight wall sections 148 overlap each other, forming additional zigzag portions of a pathway 156. The pathway defined by the pathway portions 138, 154, 156 extends as a continuous pathway from a beginning end 158 to a finishing end 162, or vice versa.

The pathway defined by the pathway portions 138, 154, 156 is dimensioned to receive a cooking fuel, for example charcoal, in the pathway from its beginning end 158 to its finishing end 162. The wall sections of the apparatus that define the pathway portions 138, 154, 156 direct the burning of the cooking fuel from the beginning end 158 to the finishing end 162, or vice versa. In this way, the pathway defined by the apparatus of FIGS. 11 and 13 sustains the burning of the cooking fuel to provide slow, low heat cooking.

Figure 12:
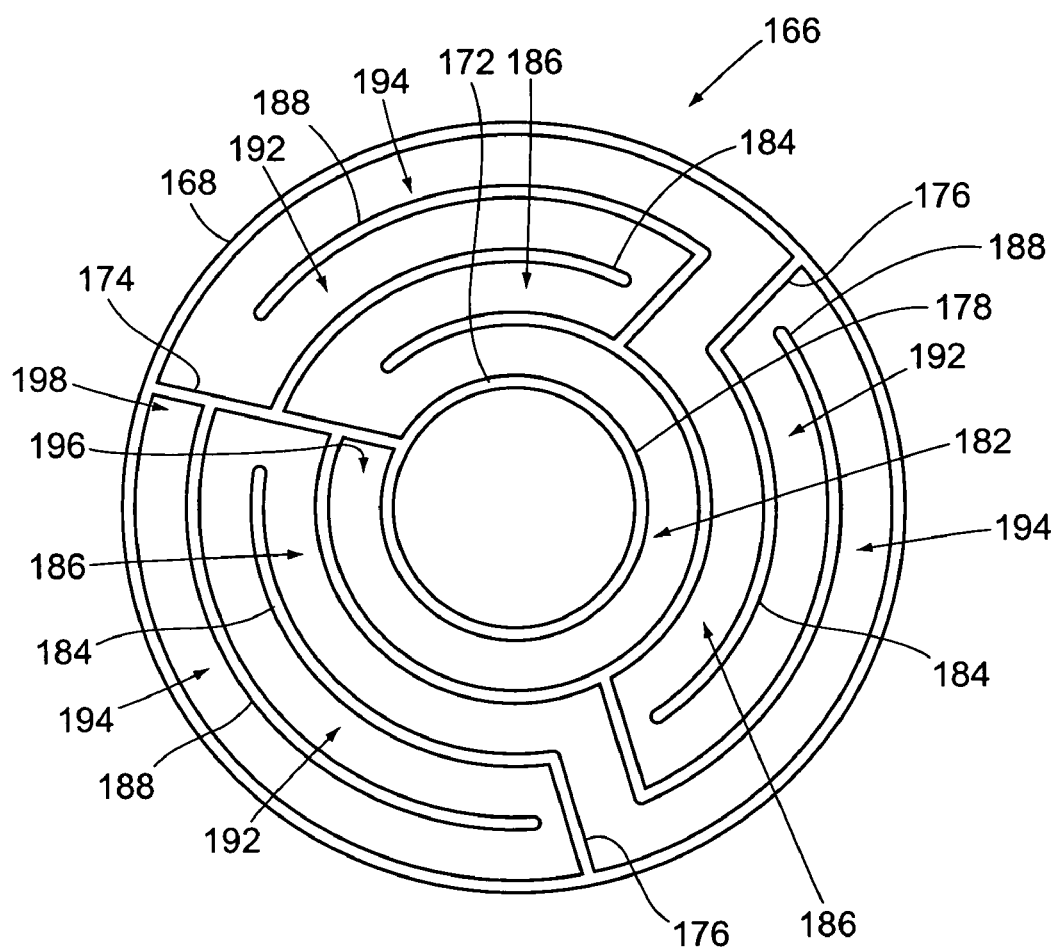
FIG. 12 is a top plan view of a still further variant embodiment of the apparatus.
Figure 14:
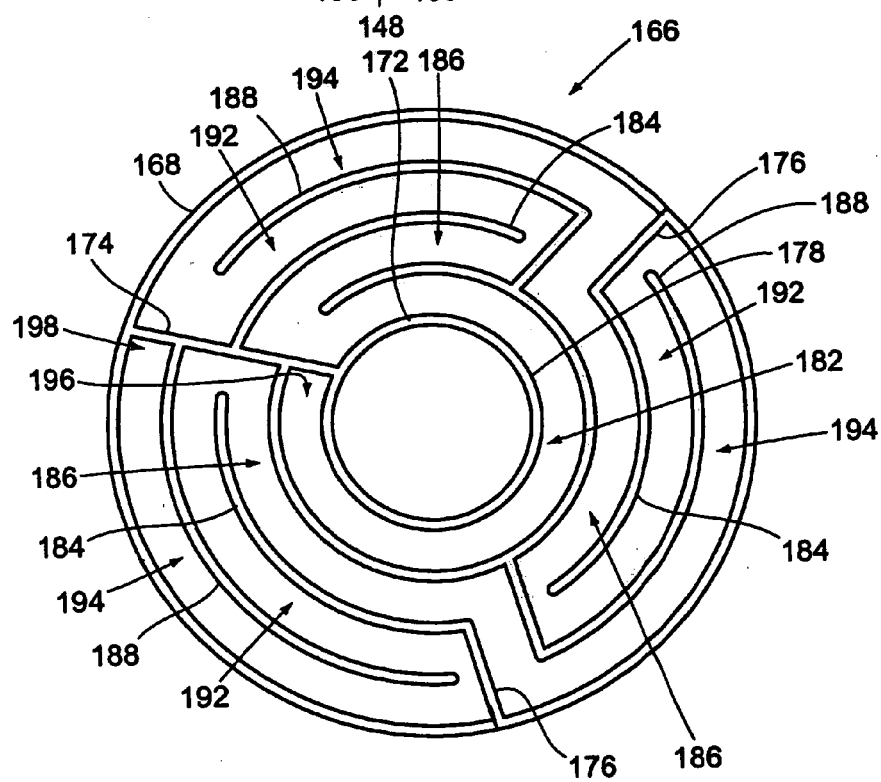
FIG. 14 is a multiple band of the apparatus of FIG. 12.

FIGS. 12 and 14 shows a still further variant embodiment of the apparatus 166 of the invention. Like the FIGS. 11 and 13 embodiment, the FIGS. 12 and 14 apparatus 166 comprises a circular outer wall 168 that defines a peripheral boundary of the apparatus. The peripheral boundary defined by the outer wall 168 is dimensioned to be received in the heat chamber 84 of an outdoor smoker/cooker, such as that shown in FIGS. 8 and 9. The FIGS. 12 and 14 embodiment also has a circular inner wall 172. A radial wall section 174 connects the circular outer wall 168 with the circular inner wall 172. Additional radial wall sections 176 extend inwardly from the outer wall 168.

A first arcuate wall section 178 is connected to the radial wall section 174 that joins the outer wall 168 with the inner wall 172. The first arcuate wall section 178 extends around almost the entire periphery of the circular inner wall 172, defining a pathway portion 182 between the circular inner wall 172 and the first arcuate wall section 178. A plurality of second arcuate wall sections 184 are spatially arranged around the first arcuate wall section 178. The plurality of second arcuate wall sections 184 are each connected to one of the radial wall sections 174, 176. The plurality of second arcuate wall sections 184 define additional pathway portions 186 between the second arcuate wall sections 184 and the first arcuate wall section 178.

A third plurality of arcuate wall sections 188 are spatially arranged around the plurality of second arcuate wall sections 184. The plurality of third arcuate wall sections 188 have equivalent curvatures to that of the plurality of second arcuate wall sections 184 and define additional pathway portions 192 between the third plurality of arcuate wall sections 188 and the second plurality of arcuate wall sections 184. The third plurality of arcuate wall sections 188 also define additional pathway portions 194 between the third plurality of arcuate wall sections 188 and the outer circular wall 168. Together, the pluralities of pathway portions 182, 186, 192, 194 define a continuous pathway from a beginning end 196 of the pathway adjacent the center of the apparatus of FIGS. 12 and 14, to a finishing end 198 of the pathway adjacent the periphery of the apparatus. The pathway is dimensioned to receive cooking fuel in the pathway and to direct the burning of the cooking fuel along the pathway, enabling slow sustained burning of the cooking fuel.

As various changes could be made in the above constructions without departing from the scope of the invention, it is intended that the above description and accompanying drawings be interpreted as illustrative and not in any limiting sense. The invention therefore shall be solely limited by the scope of the claims set forth below.

What is claimed is:

1. An apparatus to sustain fuel burning for outdoor cooking, the apparatus comprising:
an elongate band having a length with opposite first and second end edges, opposite top and bottom edges, and opposite first and second surfaces;
a plurality of curved portions in the band between the band first and second end edges, the curved portions of the band positioning a plurality of first and second surface sections opposing each other; and,
the bottom edge of the band having a curved configuration between the first and second end edges of the band, the curved configuration of the band bottom edge being adapted to rest on a convex surface.

2. The apparatus of claim 1, further comprising:
the top edge of the band between the band first and second end edges being positioned in a single plane.

3. An apparatus to sustain fuel burning for outdoor cooking, the apparatus comprising:
an elongate band having a length with opposite first and second end edges, opposite top and bottom edges and opposite first and second surfaces;
a plurality of curved portions in the band between the band first and second end edges, the curved portions of the band positioning a plurality of first and second surface sections opposing each other;
the curved portions of the band defining a pathway between the first and second surface sections opposing each other, the pathway extending between the opposing band first and second surface sections and being dimensioned to receive cooking fuel between the opposing band first and second surface sections to direct burning of the cooking fuel along the pathway and thereby sustain the burning of the cooking fuel; and,
the band having an outer peripheral boundary and the pathway overlapping within the band outer peripheral boundary.

4. An apparatus to sustain fuel burning for outdoor cooking, the apparatus comprising:
an elongate band having a length with opposite first and second end edges, opposite top and bottom edges, and opposite first and second surfaces;
a plurality of curved portions in the band between the band first and second end edges, the curved portions of the band positioning a plurality of first and second surface sections opposing each other; and,
the band having an outer peripheral boundary that extends around the length of the band and the band outer peripheral boundary being received inside a heat chamber of an outdoor smoker/cooker.

5. An apparatus to sustain fuel burning for outdoor cooking, the apparatus comprising:
an elongate band having a length with opposite first and second end edges, opposite top and bottom edges, and opposite first and second surfaces;
a plurality of curved portions in the band between the band first and second end edges, the curved portions of the band positioning a plurality of first and second surface sections opposing each other; and,
at least some of the first and second surface sections having an equivalent curvature.

6. An apparatus to sustain fuel burning for outdoor cooking, the apparatus comprising:
an elongate band having a length with opposite first and second end edges, opposite top and bottom edges, and opposite first and second surfaces;
a plurality of curved portions in the band between the band first and second end edges, the curved portions of the band positioning a plurality of first and second surface sections opposing each other; and,
the band being constructed of a consumable material.

7. An apparatus to sustain fuel burning for outdoor cooking, the apparatus comprising:
a band having an elongate length with opposite first and second end edges;
a plurality of angled portions in the band between the band first and second end edges;
a plurality of sections of the band length between the band first and second end edges, the band sections being separated from each other by the band angled portions, and at least some of the band sections overlapping each other; and,
the band having opposite top and bottom edges that extend along the length of the band, and the band bottom edge having a curved configuration between the band first and second end edges that is adapted to rest on a convex surface.

8. The apparatus of claim 7, further comprising:
the band top edge between the band first and second end edges being positioned in a single plane.

9. An apparatus to sustain fuel burning for outdoor cooking, the apparatus comprising:
a band having an elongate length with opposite first and second end edges;
a plurality of angled portions in the band between the band first and second end edges;
a plurality of sections of the band length between the band first and second end edges, the band sections being separated from each other by the band angled portions, and at least some of the band sections overlapping each other;
the overlapping band sections defining a pathway between the overlapping band sections that is dimensioned to receive cooking fuel in the pathway between the overlapping band sections to direct burning of the cooking fuel along the pathway and thereby sustain the burning of the cooking fuel; and,
the band having an outer peripheral boundary and the pathway being positioned within the outer peripheral boundary.

10. An apparatus to sustain fuel burning for outdoor cooking, the apparatus comprising:
a band having an elongate length with opposite first and second end edges;
a plurality of angled portions in the band between the band first and second end edges;
a plurality of sections of the band length between the band first and second end edges, the band sections being separated from each other by the band angled portions, and at least some of the band sections overlapping each other; and,
the band having an outer peripheral boundary that extends around the length of the band and the band outer peripheral boundary being received inside a heat chamber of an outdoor smoker/cooker.

11. An apparatus to sustain fuel burning for outdoor cooking, the apparatus comprising:
a band having an elongate length with opposite first and second end edges;

a plurality of angled portions in the band between the band first and second end edges;
a plurality of sections of the band length between the band first and second end edges, the band sections being separated from each other by the band angled portions, and at least some of the band sections overlapping each other; and,
at least some of the overlapping band sections having an equivalent curvature.

12. An apparatus to sustain fuel burning for outdoor cooking, the apparatus comprising:
a band having an elongate length with opposite first and second end edges;
a plurality of angled portions in the band between the band first and second end edges;
a plurality of sections of the band length between the band first and second end edges, the band sections being separated from each other by the band angled portions, and at least some of the band sections overlapping each other; and,
the band being constructed of a consumable material.

13. An apparatus to sustain fuel burning for outdoor cooking, the apparatus comprising:
a pair of opposing wall surfaces having a spacing between the opposing wall surfaces, the spacing being dimensioned to receive cooking fuel in the spacing, the pair of opposing wall surfaces having elongate lengths that define a pathway in the spacing between the pair of opposing wall surfaces that extends between the lengths of the pair of opposing wall surfaces, the pathway being dimensioned to receive cooking fuel in the pathway and to direct burning of the cooking fuel along the pathway and thereby sustain burning of the cooking fuel; and,
the pair of opposing wall surfaces having a common bottom edge that has a curved configuration that is adapted to rest on a convex surface.

14. The apparatus of claim 13, further comprising:
the pair of opposing wall surfaces having a common top edge that is positioned in a single plane.

15. An apparatus to sustain fuel burning for outdoor cooking, the apparatus comprising:
a pair of opposing wall surfaces having a spacing between the opposing wall surfaces, the spacing being dimensioned to receive cooking fuel in the spacing, the pair of opposing wall surfaces having elongate lengths that define a pathway in the spacing between the pair of opposing wall surfaces that extends between the lengths of the pair of opposing wall surfaces, the pathway being dimensioned to receive cooking fuel in the pathway and to direct burning of the cooking fuel along the pathway and thereby sustain burning of the cooking fuel; and,
the pair of opposing wall surfaces having an outer peripheral boundary and the pathway being entirely within the outer peripheral boundary.

16. The apparatus of claim 15, further comprising:
the pair of opposing wall surfaces outer peripheral boundary being received inside a heat chamber of an outdoor smoker/cooker.

17. An apparatus to sustain fuel burning for outdoor cooking, the apparatus comprising:
a pair of opposing wall surfaces having a spacing between the opposing wall surfaces, the spacing being dimensioned to receive cooking fuel in the spacing, the pair of opposing wall surfaces having elongate lengths that define a pathway in the spacing between the pair of opposing wall surfaces that extends between the lengths of the pair of opposing wall surfaces, the pathway being dimensioned to receive cooking fuel in the pathway and to direct burning of the cooking fuel along the pathway and thereby sustain burning of the cooking fuel; and,
at least some sections of the pair of opposing wall surfaces having an equivalent curvature.

18. An apparatus to sustain fuel burning for outdoor cooking, the apparatus comprising:
a pair of opposing wall surfaces having a spacing between the opposing wall surfaces, the spacing being dimensioned to receive cooking fuel in the spacing, the pair of opposing wall surfaces having elongate lengths that define a pathway in the spacing between the pair of opposing wall surfaces that extends between the lengths of the pair of opposing wall surfaces, the pathway being dimensioned to receive cooking fuel in the pathway and to direct burning of the cooking fuel along the pathway and thereby sustain burning of the cooking fuel; and,
the band be constructed of a consumable material.

19. A method of prolonging charcoal burning in a heat chamber of a charcoal barbecue grill, the method comprising:
providing a divider wall in a form of a loop, the divider wall having opposite interior and exterior surfaces and opposite top and bottom edges extending around the loop;
positioning the divider wall on its bottom edge in the heat chamber of the charcoal barbecue where the divider wall divides an interior volume of the heat chamber into an inner volume inside the interior surface of the divider wall and an outer volume outside the exterior surface of the divider wall and surrounding the inner volume;
arranging charcoal in the outer volume in a path around the divider wall exterior surface from a beginning of the oath to an end of the oath that is separated from the beginning of the path;
igniting the charcoal in the outer volume at the beginning of the oath whereby the charcoal burns over time through the outer volume and around the divider wall exterior surface from the beginning of the charcoal oath to the end of the charcoal path;
the heat chamber of the charcoal barbecue grill has at least a bottom structural wall and the step of positioning the divider wall in the heat chamber includes placing the divider wall bottom edge on the bottom structural wall of the heat chamber; and,
the bottom structural wall has a convex surface that supports the divider wall.

* * * * *